US010913831B2

(12) United States Patent
Mure et al.

(10) Patent No.: US 10,913,831 B2
(45) Date of Patent: Feb. 9, 2021

(54) POLYOLEFIN FILM WITH IMPROVED TOUGHNESS

(71) Applicant: Univation Technologies, LLC, Houston, TX (US)

(72) Inventors: Cliff R. Mure, Middlesex, NJ (US); Dongming Li, Houston, TX (US); Barbara J. Kopp, Middlesex, NJ (US); Mark G. Goode, S. Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 118 days.

(21) Appl. No.: 16/072,213

(22) PCT Filed: Jan. 23, 2017

(86) PCT No.: PCT/US2017/014556
§ 371 (c)(1),
(2) Date: Jul. 24, 2018

(87) PCT Pub. No.: WO2017/132092
PCT Pub. Date: Aug. 3, 2017

(65) Prior Publication Data
US 2019/0031841 A1 Jan. 31, 2019

Related U.S. Application Data

(60) Provisional application No. 62/288,892, filed on Jan. 29, 2016.

(51) Int. Cl.
*C08J 5/18* (2006.01)
*C08F 4/24* (2006.01)
(Continued)

(52) U.S. Cl.
CPC ............... *C08J 5/18* (2013.01); *C08F 4/24* (2013.01); *C08F 210/16* (2013.01);
(Continued)

(58) Field of Classification Search
CPC ... C08J 5/18; C08F 4/24; C08F 210/16; C08F 2500/12; C08F 2500/26; C08L 23/0815; C08L 2203/16
See application file for complete search history.

(56) References Cited

U.S. PATENT DOCUMENTS 7,022,781 B2    4/2006   McDaniel et al.
8,399,581 B2    3/2013   Farley et al.
(Continued)

FOREIGN PATENT DOCUMENTS

WO    WO-2015076928 A2 *   5/2015  ............. C08L 23/08

OTHER PUBLICATIONS

International Search Report & Written Opinion for related PCT Application PCT/US2017/014556, dated Apr. 21, 2017 (12 pgs).
(Continued)

*Primary Examiner* — Catherine S Branch
(74) *Attorney, Agent, or Firm* — Brooks, Cameron & Huebsch, PLLC

(57) ABSTRACT

A film formed from a polyethylene copolymer using a reduced chromium oxide catalyst, ethylene monomers and a co-monomer selected from butene monomers or 1-hexene, where the polyethylene copolymer has a density in the range of from about 0.935 to about 0.950 g/cm$^3$ and an $I_{21}/I_5$ in a range of about 18.0 to about 30.0. The film formed from the polyethylene copolymer has a dart drop impact (g/μm) that significantly greater as compared to a film of the polyethylene copolymer formed using a silyl chromate catalyst in place of the reduced chromium oxide catalyst. A method of making such films is also provided.

20 Claims, 1 Drawing Sheet

(51) Int. Cl.
  *C08F 210/16* (2006.01)
  *C08L 23/08* (2006.01)
(52) U.S. Cl.
  CPC ...... *C08L 23/0815* (2013.01); *C08F 2500/12* (2013.01); *C08F 2500/21* (2013.01); *C08F 2500/26* (2013.01); *C08J 2323/08* (2013.01); *C08L 2203/16* (2013.01)

(56) References Cited

U.S. PATENT DOCUMENTS

| | | |
|---|---|---|
| 9,303,103 B2 | 4/2016 | Moorhouse et al. |
| 2002/0042482 A1 | 4/2002 | Monoi et al. |
| 2009/0297810 A1 | 12/2009 | Fiscus et al. |
| 2015/0353717 A1 | 12/2015 | Whited et al. |
| 2016/0297907 A1 | 10/2016 | Goode et al. |

OTHER PUBLICATIONS

2nd Written Opinion for related PCT Application PCT/US2017/014556, dated Jan. 8, 2018 (6 pgs).
International Preliminary Report for Patentability for related PCT Application PCT/US2017/014556, dated Apr. 18, 2018 (12 pgs).

\* cited by examiner

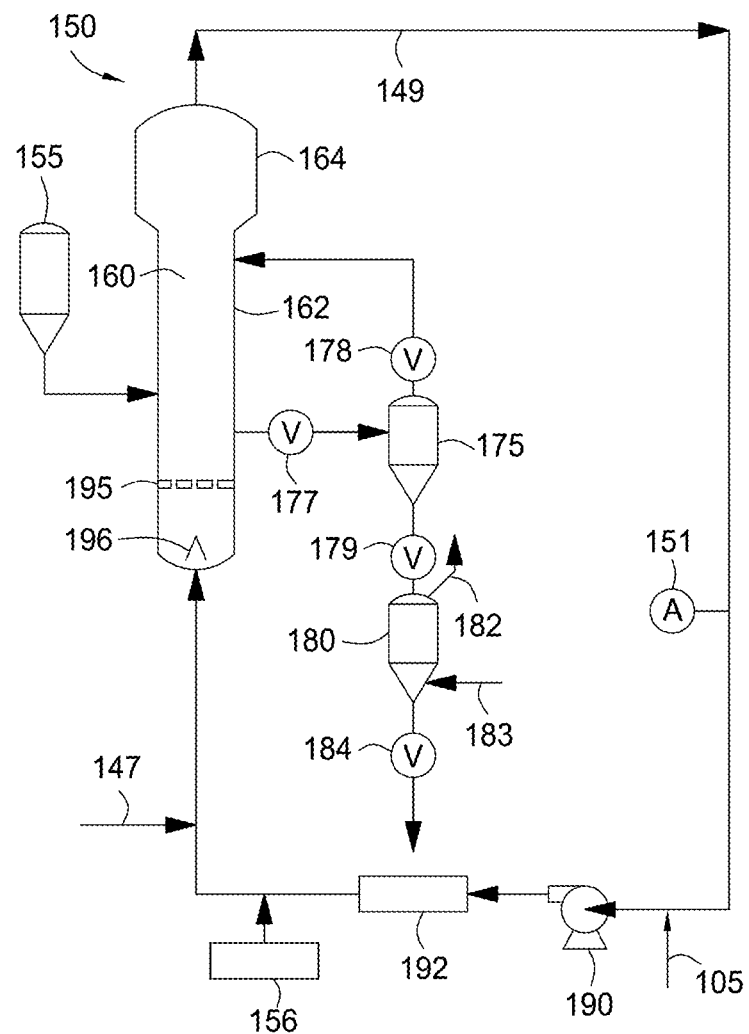

POLYOLEFIN FILM WITH IMPROVED TOUGHNESS

This application is a National Stage Application under 35 U.S.C. § 371 of International Application Number PCT/US2017/014556, filed Jan. 23, 2017 and published as WO 2017/132092 on Aug. 3, 2017, which claims the benefit to U.S. Provisional Application 62/288,892, filed Jan. 29, 2016, the entire contents of which are incorporated herein by reference in its entirety.

FIELD OF THE INVENTION

The present invention relates generally to polymer films and, more particularly, to polymer films having a balance of tear strength and dart impact performance.

DESCRIPTION OF THE RELATED ART

Ethylene polymers have been used generally and widely as resin materials for polymer films for use in various applications. Different resin properties are desirable, depending on the film-form method and the desired end use. For example, medium-to-high molecular weight polyethylenes are desirable, particularly for applications which call for strength. However, some polymers having good mechanical properties, e.g., strength, are more difficult to process. For example, while the mechanical properties of metallocene-catalyzed polymers tend to be desirable, they can be difficult to process due to their relatively narrow molecular weight distribution.

Ethylene polymers having broader molecular weight distributions can be obtained by use of a chromium catalyst. A chromium catalyst is obtained by, for example, calcining a chromium compound carried on an inorganic oxide carrier in a non-reducing atmosphere to activate it such that at least a portion of the carried chromium atoms is converted to hexavalent chromium atoms ($Cr^{+6}$). Such catalyst may be commonly referred to in the art as a "Phillips catalyst." Another chromium catalyst, typically used in the manufacture of higher density polyethylene applications, comprises a supported silyl chromate that is subsequently reduced with diethylaluminum ethoxide (DEAlE). The resulting polyethylenes produced by each of these catalysts are different in some important properties. Chromium oxide on silica catalysts have good productivity (g PE/g catalyst), also measured by activity (g PE/g catalyst-hr.), and produce polyethylenes with broad molecular weight distributions but still lower than that desired. Silyl chromate catalysts produce polyethylenes with desirable molecular weight characteristics desirable for high molecular weight applications.

For film applications, good catalyst productivity and desirable molecular weight characteristics of the polymer need to be balanced with properties that are desirable when the polymer is formed into a film. Some important features of polymer films include impact strength as measured by, e.g., Dart Impact performance, and tear strength, as measured by Elmendorf Tear Strength in the machine direction (MD) and/or transverse direction (TD). Unfortunately, polymer properties are difficult to deconvolute; i.e., features that improve performance in one aspect are often detrimental in others. To be formed into films, desirable flow properties are also beneficial. Polymer compositions that provide a good balance of properties, e.g., impact strength and flow properties, will find application where more costly or cumbersome polymers are currently used.

SUMMARY

Aspects of the invention address one or more of the shortcomings of polyethylene compositions, particularly, polyethylene compositions for film applications and films made therefrom. Aspects of the invention are based in part on the discovery that particular chromium-based catalysts, in combination with certain operating and processing conditions, can produce polyethylene copolymers with an improved balance of density, impact strength, tear strength and flow properties.

Thus, aspects of the invention relate to films comprising a polyethylene copolymer formed using a reduced chromium oxide catalyst, ethylene monomers and a co-monomer selected from 1-butene or 1-hexene, the polyethylene copolymer formed with the co-monomer to ethylene monomer mole ratio in a range of about 0.012 to about 0.04 to form the polyethylene copolymer having a density in the range of from about 0.9350 to about 0.950 g/cm$^3$ and an $I_{21}/I_5$ in a range of about 18.0 to about 30.0, wherein the polyethylene copolymer formed using the reduced chromium oxide catalyst provides an improvement in a dart drop impact (g/μm) of the film of 17 percent to 56 percent as compared to a film of the polyethylene copolymer formed using a silyl chromate catalyst in place of the reduced chromium oxide catalyst. The reduced chromium oxide catalyst can be reduced with diethylaluminum ethoxide (DEAlE).

The polyethylene copolymer can have the following properties. The polyethylene copolymer can have a melt index ($I_5$) of about 0.4 to about 1.0 g/10 min. The polyethylene copolymer can also have flow index ($I_{21}$) of about 5.0 to about 25.0 g/10 min. The polyethylene copolymer can have an $I_{21}/I_5$ of about 18.0 to about 28.0. The polyethylene copolymer can have a Mw ≥about 100,000 g/mol. The polyethylene copolymer can have a Mw/Mn of about 6.0 to about 50.0.

The film formed from the polyethylene copolymer can have the following properties. The film formed from the polyethylene copolymer can have a dart drop impact of about 10.0 to about 20.0 g/μm. The film can also have a TD Elmendorf Tear of about 2.4 g/μm to about 15.0 g/μm. The film can have an MD Elmendorf Tear of about 0.6 g/μm to about 5.0 g/μm. The film can have a 2% secant modulus from about 600 MPa to about 1400 MPa. The film can have a thickness of about 5.0 to about 75.0 μm.

The present invention also relate to the methods of making a film having improved dart impact as provided herein. The method can include providing the polyethylene copolymer formed using the reduced chromium oxide catalyst, ethylene monomers and the co-monomer selected from 1-butene or 1-hexene, where the co-monomer to ethylene monomer mole ratio is in a range of about 0.012 to about 0.04 to form the polyethylene copolymer having a density in the range of from about 0.935 to about 0.950 g/cm$^3$ and an $I_{21}/I_5$ in a range of about 18 to about 30, and forming the polyethylene into a film; wherein the polyethylene copolymer formed using the reduced chromium oxide catalyst provides an improvement in a dart drop impact (g/μm) of the film of 17 percent to 56 percent as compared to a film of the polyethylene copolymer formed using a silyl chromate catalyst in place of the reduced chromium oxide catalyst.

Another embodiment relates to a process for polymerizing olefins to produce the polymer of having a density in the range of from about 0.935 to about 0.950 g/cm$^3$ and an $I_{21}/I_5$ in a range of about 18 to about 30 comprising contacting the olefins, under polymerization conditions, with a catalyst system comprising a chromium-oxide containing catalyst compound and one or more organoaluminum activators, wherein the olefins include ethylene and one or more $C_3$ to $C_{20}$ α-olefins (e.g., 1-butene, 1-hexene, etc.).

BRIEF DESCRIPTION OF THE DRAWINGS

FIG. 1 is a simplified process flow diagram of the polymerization system in accordance with embodiments of the present techniques.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, catalyst structures, or the like, as such may vary, unless otherwise specified. It is also to be understood that the terminology used herein is for the purpose of describing particular embodiments only and is not intended to be limiting.

Definitions

For purposes herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. An oligomer is typically a polymer having a low molecular weight, such as a Mn of less than 20,000 g/mol or an Mn of less than 2,500 g/mol, or a low number of polymer units, such as 100 polymer units or less, 75 polymer units or less, or 50 polymer units or less.

As used herein the term "polyethylene" refers to compositions wherein ≥50 wt % of the monomers in the polymer units is derived from ethylene-monomer. The remaining polymer units are typically derived from one or more optional co-monomers, e.g., olefins.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 75 wt % to 85 wt %, it is understood that the polymer unit in the copolymer is derived from ethylene in the polymerization reaction and said derived units are present at 75 wt % to 85 wt %, based upon the weight of the polymer. A higher α-olefin is defined to be an α-olefin having 4 or more carbon atoms. For the purposes of this disclosure ethylene is considered an alpha-olefin. Suitable co-monomers for use in the polyethylenes described herein include $C_3$ to $C_{20}$ olefins, e.g., $C_3$ to $C_{10}$ olefins, $C_4$ to $C_8$ olefins, ethylene, propylene, butenes (e.g., 1-butene), pentenes, hexenes (e.g., 1-hexene), heptenes, octenes, and mixtures thereof.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. Mn and Mw are measured as discussed herein.

Unless otherwise stated, any reference herein to the Periodic Table of the Elements and groups thereof refers to the NEW NOTATION published in HAWLEY'S CONDENSED CHEMICAL DICTIONARY, Thirteenth Edition, John Wiley & Sons, Inc., (1997).

Polyethylene Copolymers

The polyethylene copolymers herein have a density of from 0.920 to 0.950 g/cm³. Particular such polyethylene copolymers have a density of ≥0.925 g/cm³, ≥0.930 g/cc, ≥0.935 g/cm³, ≥0.940 g/cm³, or ≥0.945 g/cm³, and a density of ≤0.950 g/cm³, ≤0.945 g/cm³, ≤0.940 g/cm³, ≤0.935 g/cm³, ≤0.930 g/cm³, or ≤0.925 g/cm³, or any combination of any high or low value recited herein. Exemplary such polyethylene copolymers include, but are not limited to, those having a density of 0.925 to 0.945 g/cm³, 0.930 to 0.940 g/cm³, 0.935 to 0.945 g/cm³, and 0.935 to 0.950 g/cm³ as specific examples.

As is known in the art, the density is influenced by the amount of co-monomer in the polyethylene copolymers. Generally, higher co-monomer content results in a lower density. Polyethylene copolymers herein have a co-monomer content of ≥0 to 15 wt % based on the total weight of the polyethylene copolymer, e.g., 1.0 to 12.0 wt %, 2.0 to 10.0 wt %, 2.0 to 8.0 wt %, 2.0 to 7.0 wt %, 2.0 to 6.0 wt %, particularly where the polyethylene copolymers comprise co-monomer units derived from 1-butene and/or 1-hexene.

The polyethylene copolymers herein may also have a weight-averaged molecular weight (Mw)≥about 100,000 g/mol, e.g., ≥about 150,000 g/mol≥about 200,000 g/mol, ≥about 300,000 g/mol, ≥about 400,000 g/mol, ≥about 500,000 g/mol, ≥about 750,000 g/mol, ≥about 1,000,000 g/mol. Additionally or alternatively, the Mw may be ≤about 1,000,000 g/mol, e.g., ≤about 750,000 g/mol, ≤about 1,000,000 g/mol, ≤about 500,000 g/mol, ≤about 400,000 g/mol, ≤about 300,000 g/mol, ≤about 200,000 g/mol, or ≤about 150,000 g/mol, or combinations of high or low value that provide range as recited herein.

Polymer melt index (also referred to as $I_2$ or $I_5$) is another indicator of polymer molecular weight. Melt index is a measure of the polymer fluidity and is also inversely related to molecular weight. A higher melt index can indicate a higher termination of active polymer chains relative to propagation, and, thus, a lower molecular weight. Typically, the $I_2$ of polyethylene copolymers useful herein is ≥about 0.01 g/10 min, ≥about 0.02 g/10 min, ≥about 0.10 g/10 min, ≥about 0.50 g/10 min, ≥about 0.75 g/10 min, ≥about 1.0 g/10 min, ≥about 2.0 g/10 min, ≥about 5.0 g/10 min, ≥about 10.0 g/10 min., or ≥about 25.0 g/10 min. Typically although not necessarily, the $I_2$ of polyethylene copolymers useful herein is ≤about 50.0 g/10 min, e.g., ≤about 25.0 g/10 min, ≤about 10.0 g/10 min, ≤about 5.0 g/10 min, ≤about 2.0 g/10 min, ≤about 1.0 g/10 min, or ≤about 0.50 g/10 min. Useful ranges include combinations of any high or low value disclosed herein. Exemplary such polyethylene copolymers include, but are not limited to, those having a $I_2$ of about 0.01 to about 50.0 g/10 min, about 0.01 to about 25.0 g/10 min, about 0.01 to about 10.0 g/10 min, about 0.01 to about 5.0 g/10 min, about 0.01 to about 2.0 g/10 min.

Typically, the $I_5$ of polyethylene copolymers useful herein is ≥about 0.10 g/10 min., e.g., ≥about 0.30 g/10 min, ≥about 0.40 g/10 min, ≥about 0.50 g/10 min, ≥about 0.60 g/10 min, ≥about 0.70 g/10 min, ≥about 1.0 g/10 min; ≥about 2.0 g/10 min, ≥about 5.0 g/10 min. or ≥about 10.0 g/10 min. Typically although not necessarily, the $I_5$ of polyethylene copolymers useful is ≤about 12.0 g/10 min, e.g., ≤about 10.0 g/10 min, ≤about 5.0 g/10 min, ≤about 2.0 g/10 min, ≤about 1.0 g/10 min, ≤about 0.70 g/10 min, or ≤about 0.5 g/10 min, or ≤about 0.40 g/10 min. Useful ranges include combinations of any high or low value disclosed herein. Exemplary such polyethylene copolymers include, but are not limited to, those having a $I_5$ of about 0.10 to about 12.0 g/10 min, about 0.30 to about 10.0 g/10 min, about 0.50 to about 5.0 g/10 min, about 0.50 to about 2.0 g/10 min, about 0.50 to about 1.0 g/10 min, about 0.30 to about 0.70 g/10 min, or about 0.4 to about 1.0 g/10 min.

As described herein, flow index (also referred to as $I_{21}$) is another parameter that affects the suitability of polyolefins, such as the polyethylene copolymers, for particular applications. The flow index is a measure of the ease of flow of the melt of a thermoplastic polymer. While $I_2$ and $I_5$ measure the weight of polymer that flows under a pressure applied via a 2.16 and 5.0 kg load, respectively, the flow index measures the weight of polymer in grams when subjected to an applied pressure of a 21.6 kg. Thus, the flow index is sometimes also referred to as the "high-load melt index." Typically, the flow index, $I_{21}$, of polyethylene copolymers useful herein is ≥about 4.0 g/10 min., e.g., ≥about 5.0 g/10 min, ≥about 7.5 g/10 min, ≥about 10.0 g/10 min, ≥about 12.5 g/10 min, ≥about 15.0 g/10 min, ≥about 17.5 g/10 min, ≥about 20.0 g/10 min, ≥about 22.5 g/10 min, ≥about 25.0 g/10 min, ≥about 27.5 g/10 min, ≥about 30.0 g/10 min, or ≥about 40.0 g/10 min. Typically, the flow index is ≤about 40.0 g/10 min, ≤about 30.0 g/10 min, ≤about 27.5 g/10 min, ≤about 25.0 g/10 min, ≤about 22.5 g/10 min, ≤about 20.0 g/10 min, ≤about 17.5 g/10 min, ≤about 15.0 g/10 min, ≤about 12.5 g/10 min, ≤about 10.0 g/10 min, ≤about 7.5 g/10 min, or ≤about 5.0 g/10 min. Useful ranges include combinations of any high or low value disclosed herein. Exemplary such polyethylene copolymers include, but are not limited to, those having a flow index of about 4.0 to about 40.0 g/10 min, about 4 to about 30.0 g/10 min, about 10.0 to about 27.5 g/10 min, about 12.5 to about 25.0 g/10 min, about 15.0 to about 22.5 g/10 min, about 5.0 to about 30.0 g/10 min, about 10.0 to 27.5 g/10 min, and about 5.0 to about 25.0 g/10 min. The ratio of the flow index to melt index ($I_2$ and/or $I_5$) can be an important parameter. Since it is the ratio of two values having the same units the ratio is dimensionless. Polyethylene copolymers useful herein also have a $I_{21}/I_5$ ratio of ≤about 32.0, ≤about 30.0, ≤about 28.0, ≤about 26.0, e.g., ≤about 25.0, ≤about 24.0, ≤about 23.0, ≤about 22.0, or ≤about 21.0. Typically, although not necessarily, the flow index is ≥about 18.0, ≥about 20.0, e.g., ≥about 21.0, ≥about 22.0, ≥about 23.0, ≥about 24.0, or ≥about 25.0. Useful ranges include combinations of any high or low value disclosed herein. Exemplary such polyethylenes include, but are not limited to, those having a $I_{21}/I_5$ ratio of about 18.0 to about 30.0 g/10 min., about 18.0 to about 28.0 g/10 min., about 20.0 to about 26.0 g/10 min., about 21.0 to about 25.0 g/10 min., and about 22.0 to about 24.0 g/10 min.

Polyethylene copolymers useful herein may also be characterized by their composition distribution breadth index (CDBI). The CDBI refers to the distribution of the fractional co-monomer content in the polymer molecules of the polyethylene. This can be measured using Fourier Transform Infrared Spectroscopy coupled to a Gel Permeation Chromatograph (GPC-FTIR) to determine co-monomer content in discrete ranges of number or weight average molecular weights ($M_n$ or $M_w$), or by using a Temperature Rise Elution Fractionation analysis. Typically, the polyethylene copolymers useful in the films described herein have a CDBI value of ≤50.0, e.g., ≤45.0, ≤40.0, ≤35.0, ≤30.0, ≤25.0. Additionally or alternatively, some polyethylene copolymers may have a CDBI of ≤45.0, ≤40.0, ≤35.0, ≤30.0, ≤25.0, or ≤20.0. Exemplary such polyethylene copolymers include, but are not limited to, those having a CDBI of 20.0 to 50.0, 25.0 to 45.0, 30.0 to 40.0, or about 35.0.

The polyethylene copolymers may also, in some embodiments, be characterized by a desirable flexural modulus (2% Secant Modulus). The flexural modulus may be ≥about 515 MPa (about 75,000 psi), e.g., ≥about 565 MPa (about 82,000 psi), ≥about 600 MPa, ≥about 615 MPa (about 89,200 psi), ≥about 620 MPa, ≥about 665 MPa (96,400 psi), ≥about 715 MPa (103,700 psi), ≥about 765 MPa (about 111,000), or ≥about 815 MPa (about 118,200 psi). Additionally or alternatively, the flexural modulus may be ≤about 1400 MPa, ≤about 865 MPa (about 125,000 psi), e.g., ≤about 815 MPa (about 118,200 psi), ≤about 765 MPa (about 111,000 psi), ≤about 715 MPa (about 103,700 psi), ≤about 665 MPa (about 96,400 psi), ≤about 615 MPa (about 89,200 psi), or ≤about 565 MPa (about 82,000). Ranges of the Flexural modulus of the polyethylene include, but are not limited to about 515 MPa (about 75,000 psi) to about 815 MPa (about 118,200 psi), about 565 MPa (about 82,000 psi) to about 765 MPa (about 111,000 psi), about 615 MPa (about 89,200 psi) to about 715 MPa (103,700 psi), about 665 MPa (96,400 psi) or about 600 MPa to about 1400 MPa.

Additives

A variety of additives may be employed in the polyethylene copolymers described herein to modulate the performance characteristics for particular applications. One or more additives may be included in the polyethylene copolymers as desired. Polyethylene copolymers herein may include about 0.1 to about 40 wt %, e.g., 5 wt % to about 25 wt %, or one or more additives, based on the total weight of the resulting polyethylene copolymer.

Examples of such additives include, but are not limited to, tackifiers, waxes, functionalized polymers such as acid modified polyolefins and/or anhydride modified polyolefins, antioxidants (e.g., hindered phenolics such as IRGANOX™ 1010 or IRGANOX™ 1076 available from Ciba-Geigy), (e.g., IRGAFOS™168 available from Ciba-Geigy), oils, compatabilizers, fillers, adjuvants, adhesion promoters, plasticizers, low molecular weight polymers, blocking agents, antiblocking agents, anti-static agents, release agents, anticling additives, colorants, dyes, pigments, processing aids, UV stabilizers, heat stabilizers, neutralizers, lubricants, surfactants, nucleating agents, flexibilizers, rubbers, optical brighteners, colorants, diluents, viscosity modifiers, oxidized polyolefins, and any combination thereof. Additives can be combined with one or both of the first or second polyethylene and/or may be combined with the blend of the first and second polyethylene as further individual components, in masterbatches, or in any combination thereof.

For stretch film applications, an additive such as a tackifier can be used in one or more layers to provide a cling force. Illustrative tackifiers include any known tackifier effective in providing and/or improving cling force such as, for example, polybutenes, low molecular weight polyisobutylenes (PIB), polyterpenes, amorphous polypropylene, ethylene vinyl acetate copolymers, microcrystalline wax, alkali metal sulfosuccinates, and mono- and di-glycerides of fatty acids, such as glycerol monostearate, glycerol monooleate, sorbitan monolaurate, sorbitan monopalmitate, sorbitan monostearate, sorbitan monooleate, hydrocarbon resins, and any combination thereof. The tackifier, if used, can be used in any concentration which will impact the desired cling force, typically from 0.1 to 20% by weight, or from 0.25 to 6.0% by weight.

Methods of Making the Polyethylene Copolymers—General Polymerization Process

The polymerization of olefins herein may be by suspension, solution, slurry, and gas phase processes, using known equipment and reaction conditions, and is not limited to any specific type of polymerization system. Generally, olefin polymerization temperatures may range from about 0 to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40° C. to about 300° C.

Embodiments of this disclosure may be especially useful with gas phase polymerization systems, at super-atmospheric pressures in the range from 0.07 to 68.9 bar (1 to 1000 psig), from 3.45 to 27.6 bar (50 to 400 psig), or from 6.89 to 24.1 bar (100 to 350 psig), and temperatures in the range from 30° C. to 130° C., from 65° C. to 110° C., from 75° C. to 120° C., or from 80° C. to 120° C. Operating temperatures may be less than 112° C. Stirred or fluidized bed gas phase polymerization systems may be of use.

Generally, a conventional gas phase, fluidized bed process is conducted by passing a stream containing one or more olefin monomers continuously through a fluidized bed reactor under reaction conditions and in the presence of a catalyst composition at a velocity sufficient to maintain a bed of solid particles in a suspended state. A stream comprising unreacted monomer is continuously withdrawn from the reactor, compressed, cooled, optionally partially or fully condensed, and recycled back to the reactor. Product is withdrawn from the reactor and replacement monomer is added to the recycle stream. Gases inert to the catalyst composition and reactants may also be present in the gas stream. The polymerization system may include a single reactor or two or more reactors in series.

Feed streams may include olefin monomer, non-olefinic gas such as nitrogen and hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. The feeds may enter the reactor at a single or multiple and different locations.

Further, the polymerization process is typically conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of about 10 to 600 ppbv, and more preferably about 10 to 500 ppbv. Organometallic compounds may be employed as scavenging agents to remove catalyst poisons, thereby increasing the catalyst activity, or for other purposes. Examples of organometallic compounds that may be added include metal alkyls, such as aluminum alkyls. Conventional additives may also be used in the process, provided they do not interfere with the mechanism of the catalyst composition in forming the desired polyolefin. For example, hydrogen gas may be added. The use of hydrogen may affect the polymer molecular weight and distribution, and may ultimately influence polymer properties. For the purpose of polymerization with the chromium-based catalysts of the current invention, the gas mole ratio of hydrogen to ethylene in the reactor may be in the range of about 0 to 0.5, 0.01 to 0.4, or 0.03 to 0.3.

An illustrative catalyst reservoir suitable for continuously feeding dry catalyst powder into the reactor is shown and described in U.S. Pat. No. 3,779,712, for example. A gas that is inert to the catalyst, such as nitrogen or argon, is preferably used to carry the catalyst into the bed. In another embodiment the catalyst is provided as a slurry in mineral oil or liquid hydrocarbon or mixture such, as for example, propane, butane, isopentane, hexane, heptane or octane. An illustrative catalyst reservoir is shown and described in WO 2004/094489. The catalyst slurry may be delivered to the reactor with a carrier fluid, such as, for example, nitrogen or argon or a liquid such as for example isopentane or other $C_3$ to $C_8$ alkanes.

In order to achieve the desired density ranges in the polyethylene copolymers it is necessary to copolymerize enough of the co-monomers with ethylene to achieve a level of about 0 to anywhere from 5, 10, or 20 weight percent of the co-monomer in the copolymer. The amount of co-monomer needed to achieve this result will depend on the particular co-monomer(s) being employed, the catalyst composition, and, particularly, the molar ratio of aluminum to chromium, catalyst preparation conditions, and reactor temperature. The ratio of the co-monomer to ethylene is controlled to obtain the desired resin density of copolymer product.

The conditions for polymerizations vary depending upon the monomers, catalysts and equipment availability. Polyolefins produced herein may include those made from olefin monomers such as ethylene and linear or branched higher alpha-olefin monomers containing 3 to about 20 carbon atoms. Exemplary higher alpha-olefin monomers may include, for example, propylene, 1-butene, 1-pentene, 1-hexene, 4-methyl-1-pentene, 1-octene, and 3,5,5-trimethyl-1-hexene. Exemplary polyolefins may include ethylene-based polymers (at least 50 mole % ethylene), including ethylene-1-butene, ethylene-1-hexene, and ethylene-1-octene copolymers.

Thus, for the various aspects of the invention and as provided in the Examples section herein the polyethylene copolymer can be formed using ethylene monomers and a co-monomer where the co-monomer to ethylene monomer mole ratio in a range of about 0.012 to about 0.04. In this example, the co-monomer can be selected from 1-butene or 1-hexene and the polyethylene copolymer is formed using the reduced chromium oxide catalyst discussed herein. The polyethylene copolymer formed can have density in the range of from about 0.9350 to about 0.950 g/cm³ and an $I_{21}/I_5$ in a range of about 18.0 to about 30.0. Films formed with this polyethylene copolymer formed using the reduced chromium oxide catalyst provide an improvement in a dart drop impact (g/μm) of the film as compared to a film of the polyethylene copolymer formed using a silyl chromate catalyst in place of the reduced chromium oxide catalyst. For example, films formed with this polyethylene copolymer formed using the reduced chromium oxide catalyst provide an improvement in a dart drop impact (g/μm) of 17 percent to 56 percent as compared to a film of the polyethylene copolymer formed using a silyl chromate catalyst in place of the reduced chromium oxide catalyst.

The processes and catalysts disclosed herein may be used to produce polyolefins such as ethylene/1-hexene copolymers or ethylene homopolymers under specific reactor conditions. For example, the $H_2/C_2$ gas molar ratio may be in the range of from about 0.01 to about 0.5. Oxygen add back may be in the range of from about 10 to about 600 ppbv relative to the ethylene feed rate to the reactor. The reactor operating temperature may be in the range of from about 75 to about 120° C. The reactor may be optionally run in the condensing mode. The conditions for polymerizations vary depending upon the monomers, catalysts, and equipment availability.

Detailed Polymerization Description

Referring to FIG. 1, an illustrative polymerization section 150 can include a reactor 160 in fluid communication with one or more discharge tanks 175 (only one shown), surge tanks 180 (only one shown), and recycle compressors 190 (only one shown). The polymerization section 150 can also include more than one reactor 160 arranged in series, parallel, or configured independent from the other reactors, each reactor having its own associated tanks 175, 180 and compressors 190 or alternatively, sharing any one or more of the associated tanks 175, 180 and compressors 190. For simplicity and ease of description, embodiments of the invention will be further described in the context of a single reactor train.

In one or more embodiments, the reactor 160 can include a reaction zone 162 in fluid communication with a velocity reduction zone 164. The reaction zone 162 can include a bed of growing polymer particles, formed polymer particles and catalyst particles fluidized by the continuous flow of polymerizable and modifying gaseous components in the form of make-up feed and recycle fluid through the reaction zone 162.

Referring again to FIG. 1, a feedstream 105 can be directed to enter the cycle line before the blower but may also be at any point in the polymerization system including to the reactor fluid bed, the expanded section or to the cycle line before or after the cooler as depicted with alternative feedstream location 147. The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, and derivatives thereof. The feed stream also includes non-olefinic gas such as nitrogen and hydrogen. The feeds may enter the reactor at multiple and different locations. For example, monomers can be introduced into the polymerization zone in various ways including direct injection through a nozzle (not shown in the drawing) into the bed. The feed stream may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof.

For the purpose of polymerization with chromium-based catalysts including those modified with aluminum alkyls, the gas mole ratio of hydrogen to ethylene in the reactor is typically in the range of about 0 to 0.5, more typically in the range of 0.01 to 0.4 and most typically in the range of 0.03 to 0.3. A preferred embodiment includes the addition of hydrogen gas. The use of hydrogen affects the polymer molecular weight and distribution, and ultimately influences the polymer properties.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone 162, the superficial gas velocity through the bed must exceed the minimum flow required for fluidization. Preferably, the superficial gas velocity is at least two times the minimum flow velocity. Ordinarily, the superficial gas velocity does not exceed 5.0 ft/sec (1.52 m/sec) and usually no more than 2.5 ft/sec (0.76 m/sec) is sufficient.

In general, the height to diameter ratio of the reaction zone 162 can vary in the range of from about 2:1 to about 5:1. The range, of course, can vary to larger or smaller ratios and depends upon the desired production capacity. The cross-sectional area of the velocity reduction zone 164 is typically within the range of about 2 to about 3 multiplied by the cross-sectional area of the reaction zone 162.

The velocity reduction zone 164 has a larger inner diameter than the reaction zone 162. As the name suggests, the velocity reduction zone 164 slows the velocity of the gas due to the increased cross sectional area. This reduction in gas velocity drops the entrained particles into the bed, allowing primarily only gas to flow from the reactor 160. That gas exiting the overhead of the reactor 160 is the recycle gas stream 149.

The recycle stream 149 is compressed in a compressor 190 and then passed through a heat exchange zone where heat is removed before it is returned to the bed. The heat exchange zone is typically a heat exchanger 192 which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor 160. The cooled recycle stream absorbs the heat of reaction generated by the polymerization reaction.

Preferably, the recycle stream is returned to the reactor 160 and to the fluidized bed through a gas distributor plate 195. A gas deflector 196 is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. Nos. 4,933,149 and 6,627,713.

An activated precursor composition with or without an aluminum alkyl modifier (hereinafter collectively referred to as catalyst) is preferably stored for service in a catalyst reservoir 155 under a blanket of a gas which is inert to the stored material, such as nitrogen or argon. Preferably, the catalyst reservoir 155 is equipped with a feeder suitable to continuously feed the catalyst into the reactor 160. An illustrative catalyst reservoir is shown and described in U.S. Pat. No. 3,779,712, for example. A gas that is inert to the catalyst, such as nitrogen or argon, is preferably used to carry the catalyst into the bed. Preferably, the carrier gas is the same as the blanket gas used for storing the catalysts in the catalyst reservoir 155. In one embodiment the catalyst is a dry powder and the catalyst feeder comprises a rotating metering disk. In another embodiment the catalyst is provided as a slurry in mineral oil or liquid hydrocarbon or mixture such as for example propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid such as for example isopentane or other $C_3$ to $C_8$ alkane.

The catalyst is injected at a point into the bed where good mixing with polymer particles occurs. For example, the catalyst is injected into the bed at a point above the distributor plate 195. Injecting the catalyst at a point above the distribution plate 195 provides satisfactory operation of a fluidized-bed polymerization reactor. Injection of the catalyst into the area below the distributor plate 195 could cause polymerization to begin there and eventually cause plugging of the distributor plate 195. Injection directly into the fluidized bed aids in distributing the catalyst uniformly throughout the bed and tends to avoid the formation of localized spots of high catalyst concentration which can cause "hot spots" to form. Injection of the catalyst into the reactor 160 above the bed can result in excessive catalyst carryover into the recycle line 149 where polymerization could occur leading to plugging of the line 149 and heat exchanger 192.

The modifier compound (e.g., an aluminum alkyl compound, non-limiting illustrative examples of which are triethyl aluminum and diethyl aluminum ethoxide), can be added to the reaction system either directly into the fluidized bed or downstream of the heat exchanger 192, in which case the modifier is fed into the recycle system from a dispenser 156. The amount of modifier added to the polymerization reactor when using the chromium based catalyst can be, broadly speaking, in the range of about 0.005 to about 10 modifier to chromium on a molar basis, or more narrowly in the range of about 0.01 to 5 and even more narrowly in the range of about 0.03 to 3 and most narrowly in the range of 0.05 to 2. The resulting Fluidized Bulk Density and Settled Bulk Density of the resin may in some few cases be depressed by about 2 to 4 lb/ft$^3$.

The polymerization reaction is conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of about 10 to 600 ppbv, and more preferably about 10 to 500 ppbv.

In order to achieve the desired density ranges in the copolymers it is necessary to copolymerize enough of the co-monomers with ethylene to achieve a level of about 0 to anywhere from 5, 10 or 20 weight percent of the co-monomer in the copolymer. The amount of co-monomer needed to achieve this result will depend on the particular co-monomer(s) being employed, the catalyst composition, and, particularly, the molar ratio of aluminum to chromium, catalyst preparation conditions, and reaction temperature. The ratio of the co-monomer to ethylene is controlled to obtain the desired resin density of copolymer product.

A gas analyzer 151 can be used to determine the composition of the recycle stream and the composition of the make-up feedstream stream 105 and 147 can be adjusted accordingly to maintain an essentially steady state gaseous composition within the reaction zone 162. The gas analyzer 151 can be a conventional gas analyzer that determines the recycle stream composition to maintain the ratios of feed stream components. Such equipment is commercially available from a wide variety of sources. The gas analyzer 151 may be positioned to receive gas from a sampling point located between the velocity reduction zone 164 and heat exchanger 192.

The rate of polymer production in the bed depends on the rate of catalyst injection and the concentration of monomer(s) in the reaction zone. The production rate is conveniently controlled by adjusting the rate of catalyst injection. Since any change in the rate of catalyst injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no or negligible vaporizable liquid is present in the inlet fluid.

On discharge of particulate polymer product from reactor 160, it is desirable and preferable to separate fluid from the product and to return the fluid to the recycle line 149. There are numerous ways known to the art to accomplish this separation. In one or more embodiments, fluid and product leave the reactor 160 and enter the product discharge tanks 175 (one is shown) through valve 177, which may be a ball valve designed to have minimum restriction to flow when opened. Positioned above and below the product discharge tank 175 are conventional valves 178, 179. The valve 179 allows passage of product into the product surge tanks 180 (only one is shown).

In a typical mode of operation, valve 177 is open and valves 178,179 are in a closed position. Product and fluid enter the product discharge tank 175. Valve 177 closes and the product is allowed to settle in the product discharge tank 175. Valve 178 is then opened permitting fluid to flow from the product discharge tank 175 to the reactor 162. Valve 178 is then closed and valve 179 is opened and any product in the product discharge tank 175 flows into the product surge tank 180. Valve 179 is then closed. Product is then discharged from the product surge tank 180 through valve 184. The product can be further purged to remove residual hydrocarbons and conveyed to storage or compounding. The particular timing sequence of the valves 177, 178, 179, 184 is accomplished by the use of conventional programmable controllers which are well known in the art.

Another preferred product discharge system which may be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor is equipped with an adequate venting system (not shown) to allow venting the bed during start up and shut down. The reactor does not require the use of stirring and/or wall scraping. The recycle line 149 and the elements therein (compressor 190, heat exchanger 192) is desirably smooth surfaced and devoid of unnecessary obstructions so as not to impede the flow of recycle fluid or entrained particles.

Various techniques for preventing fouling of the reactor and polymer agglomeration can be used. Illustrative of these techniques are the introduction of finely divided particulate matter to prevent agglomeration, as described in U.S. Pat. Nos. 4,994,534 and 5,200,477; the addition of negative charge generating chemicals to balance positive voltages or the addition of positive charge generating chemicals to neutralize negative voltage potentials as described in U.S. Pat. No. 4,803,251. Antistatic substances may also be added, either continuously or intermittently to prevent or neutralize electrostatic charge generation. Condensing mode operation such as disclosed in U.S. Pat. Nos. 4,543,399 and 4,588,790 can also be used to assist in heat removal from the fluid bed polymerization reactor.

The conditions for polymerizations vary depending upon the monomers, catalysts and equipment availability. The specific conditions are known or readily derivable by those skilled in the art. For example, the temperatures may be in the range from 30° C. to 130° C., from 65° C. to 110° C., from 75° C. to 120° C., or from 80° C. to 120° C. Operating temperatures may be less than 112° C. Embodiments of this disclosure may be especially useful with gas phase polymerization systems, at super-atmospheric pressures in the range from 0.07 to 68.9 bar (1 to 1000 psig), from 3.45 to 27.6 bar (50 to 400 psig), or from 6.89 to 24.1 bar (100 to 350 psig), Additional details of polymerization can be found in U.S. Pat. No. 6,627,713, which is incorporated by reference at least to the extent it discloses polymerization details.

Catalyst

The chromium-based catalyst compositions disclosed herein may include chromium-based catalysts and reducing agents. The chromium-based catalysts used in embodiments of the present disclosure may include chromium oxide catalysts reduced with metal alkyl. Silyl chromate catalysts, reduced with metal alkyl provided the counter examples.

The chromium compounds used to prepare chromium oxide catalysts may include $CrO_3$ or any compound convertible to $CrO_3$ under the activation conditions employed. Many compounds convertible to $CrO_3$ are disclosed in U.S. Pat. Nos. 2,825,721, 3,023,203, 3,622,251, and 4,011,382 and include chromic acetyl acetonate, chromic halide, chromic nitrate, chromic acetate, chromic sulfate, ammonium chromate, ammonium dichromate, or other soluble, chromium containing salts. In some embodiments, chromic acetate may be used.

The silyl chromate compounds used to prepare the counter example silyl chromate catalysts described herein may include bis-triethylsilyl chromate, bis-tributylsilyl chromate, bis-triisopentylsilyl chromate, bis-tri-2-ethylhexylsilyl chromate, bis-tridecylsilyl chromate, bis-tri(tetradecyl)silyl chromate, bis-tribenzylsilyl chromate, bis-triphenylethylsilyl chromate, bis-triphenylsilyl chromate, bis-tritolylsilyl chromate, bis-trixylylsilyl chromate, bis-trinaphthylsilyl chromate, bis-triethylphenylsilyl chromate, bis-trimethylnaphthylsilyl chromate, polydiphenylsilyl chromate, and polydiethylsilyl chromate. Examples of such catalysts are disclosed, for example, in U.S. Pat. Nos. 3,324,101, 3,704, 287, and 4,100,105, among others. In some embodiments, bis-triphenylsilyl chromate, bis-tritolylsilyl chromate, bis-trixylylsilyl chromate, and bis-trinaphthylsilyl chromate may be used. In other embodiments, bis-triphenylsilyl chromate may be used.

The silyl chromate compounds may be deposited onto conventional catalyst supports or bases, for example, inorganic oxide materials. The chromium compound used to produce a chromium oxide catalyst may be deposited onto conventional catalyst supports. The term "support," as used herein, refers to any support material, a porous support material in one exemplary embodiment, including inorganic or organic support materials. Desirable carriers may be inorganic oxides that include Group 2, 3, 4, 5, 13 and 14 oxides, and more particularly, inorganic oxides of Group 13 and 14 atoms. The Group element notation in this specification is as defined in the Periodic Table of Elements according to the IUPAC 1988 notation (IUPAC Nomenclature of Inorganic Chemistry 1960, Blackwell Publ., London). Therein, Groups 4, 5, 8, 9 and 15 correspond respectively to Groups IVB, VB, IIIA, IVA and VA of the Deming notation (Chemical Rubber Company's Handbook of Chemistry & Physics, 48th edition) and to Groups IVA, VA, IIIB, IVB and VB of the IUPAC 1970 notation (Kirk-Othmer Encyclopedia of Chemical Technology, 2nd edition, Vol. 8, p. 94). Non-limiting examples of support materials include inorganic oxides such as silica, alumina, Mania, zirconia, thoria, as well as mixtures of such oxides such as, for example, silica-chromium, silica-alumina, silica-titania, and the like.

The inorganic oxide materials which may be used as a support in the catalyst compositions of the present disclosure are porous materials having variable surface area and particle size. The support may have a surface area in the range of 50 to 1000 square meters per gram, and an average particle size of 20 to 300 micrometers. The support may have a pore volume of about 0.5 to about 6.0 $cm^3/g$ and a surface area of about 200 to about 600 $m^2/g$. In other embodiments, the support may have a pore volume of about 1.1 to about 1.8 $cm^3/g$ and a surface area of about 245 to about 375 $m^2/g$. Additionally, the support may have a pore volume of about 2.4 to about 3.7 $cm^3/g$ and a surface area of about 410 to about 620 $m^2/g$. Additionally, the support may have a pore volume of about 0.9 to about 1.4 $cm^3/g$ and a surface area of about 390 to about 590 $m^2/g$. Each of the above properties may be measured using conventional techniques as known in the art.

The support materials may comprise silica, particularly amorphous silica, and most particularly high surface area amorphous silica. Such support materials are commercially available from a number of sources. Such sources include the W.R. Grace and Company which markets silica support materials under the trade names of Sylopol 952 or Sylopol 955, and PQ Corporation, which markets silica support materials under various trade designations, including ES70. The silica is in the form of spherical particles, which are obtained by a spray-drying process. Alternatively, PQ Corporation markets silica support materials under trade names such as MS3050 which are not spray-dried. As procured, all of these silicas are not calcined (i.e., not dehydrated). However, silica that is calcined prior to purchase may be used in catalysts of the present disclosure.

Supported chromium compounds, such as chromium acetate, which are commercially available, may also be used. Commercial sources include the W.R. Grace and Company which markets chromium on silica support materials under trade names such as Sylopol 957, Sylopol 957HS, or Sylopol 957BG, and PQ Corporation, which markets chromium on silica support materials under various trade names, such as ES370. The chromium on silica support is in the form of spherical particles, which are obtained by a spray-drying process. Alternatively, PQ Corporation markets chromium on silica support materials under trade names such as C35100MS and C35300MS which are not spray-dried. As procured, all of these silicas are not activated. However, if available, chromium supported on silica that is activated prior to purchase may be used in catalysts of the present disclosure.

Activation of the supported chromium oxide catalyst can be accomplished at nearly any temperature from about 300°

C. up to the temperature at which substantial sintering of the support takes place. For example, activated catalysts may be prepared in a fluidized-bed, as follows. The passage of a stream of dry air or oxygen through the supported chromium-based catalyst during the activation aids in the displacement of any water from the support and converts, at least partially, chromium species to Cr+6.

Temperatures used to activate the chromium oxide-based catalysts are often high enough to allow rearrangement of the chromium compound on the support material. Peak activation temperatures of from about 300° C. to about 900° C. for periods of from greater than 1 hour to as high as 48 hours are acceptable. The supported chromium oxide catalysts may be activated at temperatures from about 400° C. to about 850° C., from about 500° C. to about 700° C., and from about 550° C. to about 650° C. Exemplary activation temperatures are about 600° C., about 700° C., and about 800° C. Selection of an activation temperature may take into account the temperature constraints of the activation equipment. The supported chromium oxide catalysts may be activated at a chosen peak activation temperature for a period of from about 1 to about 36 hours, from about 3 to about 24 hours, and from about 4 to about 6 hours. Exemplary peak activation times are about 4 hours and about 6 hours. Activation is typically carried out in an oxidative environment; for example, well dried air or oxygen is used and the temperature is maintained below the temperature at which substantial sintering of the support occurs. After the chromium compounds are activated, a powdery, free-flowing particulate chromium oxide catalyst is produced.

The cooled, activated chromium oxide catalyst may then be slurried and contacted with a reducing agent, fed at a selected feed rate over a selected time period, to result in a catalyst composition having a flow index response within a selected range. The solvent may then be substantially removed from the slurry to result in a dried, free-flowing catalyst powder, which may be fed to a polymerization system as is or slurried in a suitable liquid prior to feeding.

In a class of embodiments, because organometallic components used in the preparation of the catalysts and catalyst compositions of the present disclosure may react with water, the support material should preferably be substantially dry. For example, where the chromium-based catalysts are silyl chromates, the untreated supports may be dehydrated or calcined prior to contacting with the chromium-based catalysts.

The support may be calcined at elevated temperatures to remove water, or to effectuate a chemical change on the surface of the support. Calcination of support material can be performed using any procedure known to those of ordinary skill in the art, and the present invention is not limited by the calcination method.

For example, calcined silica may be prepared in a fluidized-bed, as follows. A silica support material (e.g. Sylopol 955), is heated in steps or steadily from ambient temperature to the desired calcining temperature (e.g., 600° C.) while passing dry nitrogen or dry air through or over the support material. The silica is maintained at about this temperature for about 1 to about 4 hours, after which it is allowed to cool to ambient temperature. The calcination temperature primarily affects the number of OH groups on the support surface; i.e., the number of OH groups on the support surface (silanol groups in the case of silica) is approximately inversely proportional to the temperature of drying or dehydration: the higher the temperature, the lower the hydroxyl group content.

Support materials are calcined at a peak temperature from about 350° C. to about 850° C., from about 400° C. to about 700° C., or from about 500° C. to about 650° C. Exemplary calcination temperatures are about 400° C., about 600° C., and about 800° C. Total calcination times may be from about 2 hours to about 24 hours, from about 4 hours to about 16 hours, from about 8 hours to about 12 hours. Exemplary times at peak calcination temperatures are about 1 hour, about 2 hours, and about 4 hours.

The silyl chromate compound may be contacted with the calcined support to form a "bound catalyst." The silyl chromate compound may be contacted with the calcined support material in any of the ways known to one of ordinary skill in the art. The silyl chromate compound may be contacted with the support by any suitable means, such as in a solution, slurry, or solid form, or some combination thereof, and may be heated to any desirable temperature, for a specified time sufficient to effectuate a desirable chemical/physical transformation.

This contacting and transformation are usually conducted in a non-polar solvent. Suitable non-polar solvents may be materials which are liquid at contacting and transformation temperatures and in which some of the components used during the catalyst preparation, i.e., silyl chromate compounds and reducing agents are at least partially soluble. The non-polar solvents may be alkanes, particularly those containing about 5 to about 10 carbon atoms, such as pentane, isopentane, hexane, isohexane, n-heptane, isoheptane, octane, nonane, and decane. They may be cycloalkanes, particularly those containing about 5 to about 10 carbon atoms, such as cyclohexane and methylcyclohexane, may also be used. The non-polar solvent may also be a solvent mixture. Exemplary non-polar solvents are isopentane, isohexane, and hexane. Isopentane may be used due to its low boiling point which makes its removal convenient and fast. The non-polar solvent may be purified prior to use, such as by degassing under vacuum and/or heat or by percolation through silica gel and/or molecular sieves, to remove traces of water, molecular oxygen, polar compounds, and other materials capable of adversely affecting catalyst activity.

The mixture may be mixed for a time sufficient to support or react the silyl chromate compound on the silica support. The reducing agent may then be contacted with this slurry, where the reducing agent is fed at a selected feed rate over a selected time period to result in a catalyst having a flow index response within a selected range. Alternatively, after supporting the silyl chromate compound on the support, and before adding the reducing agent, the solvent may then be substantially removed by evaporation, to yield a free-flowing supported silyl chromate on support. The thus supported silyl chromate may be re-slurried in the same or a different non-polar solvent and contacted with a reducing agent to result in a selected flow index response.

Once the catalyst is supported, and in the case of chromium oxide catalysts, activated, the chromium-based catalyst composition may then be slurried in a non-polar solvent, prior to the addition of the reducing agent. The supported catalyst may be chromium oxide supported catalysts, silyl chromate catalysts, or a mixture of both. This slurry is prepared by admixture of the supported catalyst with the non-polar solvent. In some embodiments, the supported silyl chromate compound is not dried before the addition of the reducing agent, but instead is left slurried in the non-polar solvent for reasons such as reduced costs.

The chromium-based catalysts of the present disclosure are then contacted with a reducing agent. Reducing agents used may be organoaluminum compounds such as aluminum alkyls and alkyl aluminum alkoxides. Alkyl aluminum alkoxides, of the general formula $R_2AlOR$, may be suitable for use in embodiments of this disclosure. The R or alkyl groups of the above general formula may be the same or different, may have from about 1 to about 12 carbon atoms in some embodiments, about 1 to about 10 carbon atoms in other embodiments, about 2 to about 8 carbon atoms in yet other embodiments, and about 2 to about 4 carbon atoms in further embodiments. Examples of the alkyl aluminum alkoxides include, but are not limited to, diethylaluminum methoxide, diethylaluminum ethoxide (DEAlE), diethylaluminum propoxide, diethylaluminum iso-propoxide, diethylaluminum tert-butoxide, dimethylaluminum ethoxide, di-isopropyl aluminum ethoxide, di-isobutyl aluminum ethoxide, methyl ethyl aluminum ethoxide and mixtures thereof.

The reducing agent may be added to a mixture of a supported silyl chromate catalyst with a non-polar solvent in a catalyst mix vessel or other catalyst preparation vessel. The reducing agent may be added to a mixture of an activated chromium oxide catalyst with a non-polar solvent in a catalyst mix vessel. The reducing agent may be added to a mixture of silyl chromate catalysts and activated chromium oxide-based catalyst in a non-polar solvent in a catalyst mix vessel. When both chromium oxide-based catalysts and silyl chromate-based catalysts are employed together in this disclosure, each catalyst is typically deposited on a separate support and receives different calcination or activation treatments prior to mixing together. Again, the reducing agent may include an organoaluminum compound, an aluminum alkyl, an alkyl aluminum alkoxide such as diethylaluminum ethoxide (DEAlE), an trialkylaluminum such as triethylaluminum (TEAl), a mixture of DEAlE and TEAl, and other organoaluminum compounds, and so forth.

The addition of the reducing agent to the catalyst slurry may be conducted at elevated temperatures and under an inert atmosphere, such as up to 7 bar (100 psig) nitrogen head pressure. For example, the slurry may be maintained at a temperature between about 30° C. and 80° C. during admixture of the reducing agent, or at a temperature between about 40° C. and about 60° C., or at a temperature between about 40° C. and about 50° C., such as about 45° C.

The silyl chromate compounds used to prepare the silyl chromate catalysts disclosed herein may include bis-triethylsilyl chromate, bis-tributylsilyl chromate, bis-triisopentylsilyl chromate, bis-tri-2-ethylhexylsilyl chromate, bis-tridecylsilyl chromate, bis-tri(tetradecyl)silyl chromate, bis-tribenzylsilyl chromate, bis-triphenylethylsilyl chromate, bis-triphenylsilyl chromate, bis-tritolylsilyl chromate, bis-trixylylsilyl chromate, bis-trinaphthylsilyl chromate, bis-triethylphenylsilyl chromate, bis-trimethylnaphthylsilyl chromate, polydiphenylsilyl chromate, and polydiethylsilyl chromate. In some embodiments, bis-triphenylsilyl chromate, bis-tritolylsilyl chromate, bis-trixylylsilyl chromate, and bis-trinaphthylsilyl chromate may be used. In other embodiments, bis-triphenylsilyl chromate may be used.

Chromium-based catalysts formed by the above described processes may have a chromium loading on the support ranging from about 0.15 to about 3 weight percent based on the total weight of the catalyst in some embodiments; from about 0.2 to about 0.3 weight percent in other embodiments; from about 0.4 to about 0.6 weight percent in other embodiments; and from about 0.7 to about 1.2 weight percent in other embodiments. Chromium-based catalysts formed by the above described processes may have a reducing agent to chromium molar ratio ranging from about 0.5 to about 8 in some embodiments; from about 2 to about 7 in other embodiments; and from about 3.0 to about 5.5 in yet other embodiments.

Reactor process variables may be adjusted to obtain the desired polymer flow index and melt index when using prior art chromium-based catalysts for which the flow index response was not tailored as according to embodiments disclosed herein. For example, increasing the temperature of polymerization is known to enhance the rate of termination, but have a comparatively minor effect on the rate of propagation, as reported in M. P. McDaniel, Advances in Catalysis, Vol. 33 (1985), pp 47-98. This may result in more short chain polymers and an increase in melt index and flow index. Catalysts having a low flow index response therefore often require higher reactor temperatures, higher oxygen add-back, and higher hydrogen concentrations to produce a polymer of a given flow index.

However, there are limits on the range over which reactor process variables may be adjusted, such as, for example, reactor temperature, hydrogen and oxygen levels, without adversely affecting the polymerization process or the catalyst productivity. For example, excessively high reactor temperatures may approach the softening or melting point of the formed polymer. This may then result in polymer agglomeration and reactor fouling. Alternatively, low reactor temperatures may lead to a smaller temperature differential with respect to the cooling water, less efficient heat removal, and ultimately lowered production capacity. Further, high oxygen add-back concentrations may lead to reduced catalyst productivity, smaller average polymer particle size, and higher fines which may contribute to reactor fouling. Additionally, variations in hydrogen concentrations may impact polymer properties such as, for example, die swell which may in turn affect the suitability of a polymer for its desired application. Accordingly, adjusting reactor variables to approach operational limits may result in operational problems which may lead to premature reactor shutdown and downtime due to extensive clean-up procedures, as well as undesired gels and other undesired properties of the resulting polymer product.

Film

Films can be formed by any number of well-known extrusion or coextrusion techniques. Any of the blown, tentered, or cast film techniques commonly used are suitable. Films can be unoriented, uniaxially oriented, or biaxially oriented. The films can further be embossed, produced, and/or processed according to other known film processes. The films can be tailored to specific applications by adjusting the thickness, materials, and order of the various layers, as well as the additives applied or introduced to each layer.

While the films are generally envisioned to be monolayers, the monolayer film as described herein may be combined with other layers for form multilayer films or laminates using well-known techniques, e.g., a chill roll casting process. For example, a polyethylene can be extruded in a molten state through a flat die and then cooled to form a film. As a specific example, cast films can be prepared using a cast film line machine as follows. Pellets of the polymer are melted at a temperature typically ranging from about 275° C. to about 325° C. for cast polymers (depending upon the particular polymer(s) used), with the specific melt temperature being chosen to match the melt viscosity of the particular polymer(s). In the case of a multilayer cast film, the two or more different melts can be conveyed to a coextrusion adapter that combines the two or more melt flows into a multilayer, coextruded structure. This layered flow can be distributed through a single manifold film extrusion die to the desired width. The die gap opening is typically about 600 µm (0.025 inches). The material can then be drawn down to the final gauge. The material draw down ratio is typically about 21:1 for 20 µm (0.8 mil) films. A vacuum box, edge pinners, air knife, or any combination thereof, can be used to pin the melt exiting the die opening to a primary chill roll maintained at about 32° C. (80° F.). The resulting film can be collected on a winder. The film thickness can be monitored by a gauge monitor, and the film can be edge trimmed by a trimmer. A typical cast line rate is from about 76.2 m to about 610 m (250 to about 2,000 feet) per minute. One skilled in the art will appreciate that higher rates may be used for similar processes such as extrusion coating. One or more optional treaters can be used to surface treat the film, if desired. Such chill roll casting processes and apparatus can be as discussed and described in, for example, The Wiley-Encyclopedia of Packaging Technology, Second Edition, A. L. Brody and K. S. Marsh, Ed., John Wiley and Sons, Inc., New York (1997). Although chill roll casting is one example, other forms of casting may be employed.

The polyethylene copolymers can be formed into monolayer and/or multilayer films using blown techniques, i.e., to form a blown film. For example, the polyethylene copolymers can be extruded in a molten state through an annular die and then blown and cooled to form a tubular, blown film, which can then be axially slit and unfolded to form a flat film. As a specific example, blown films can be prepared as follows. The polymer can be introduced into the feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film can be extruded through the die into a film cooled by blowing air onto the surface of the film. The film can be drawn from the die typically forming a cylindrical film that can be cooled, collapsed and, optionally, subjected to a desired auxiliary process, such as slitting, treating, sealing, or printing. Typical melt temperatures can range from about 175° C. to about 225° C. Blown film rates can generally range from about 4.35 kg/hr/cm to about 26 kg/hr/cm (5 lbs/hr/in to about 30 lbs/hr/in) of die circumference. The finished film can be wound into rolls for later processing or can be fed into a bag machine and converted into bags. A particular blown film process and apparatus suitable for forming films can be as discussed and described in, for example, U.S. Pat. No. 5,569,693. Of course, other blown film forming methods can also be used.

Films formed from the polyethylene copolymers can be uniaxially or biaxially oriented. Orientation in the direction of extrusion is known as machine direction (MD) orientation. Orientation perpendicular to the direction of extrusion is known as transverse direction (TD) orientation. Orientation can be accomplished by stretching or pulling a film first in the MD followed by TD orientation. Blown films or cast films can also be oriented by a tenter-frame orientation subsequent to the film extrusion process, again in one or both directions. Orientation can be sequential or simultaneous, depending upon the desired film features. Preferred orientation ratios can be about three to about six times the extruded width in the machine direction and between about four to about ten times the extruded width in the transverse direction. Typical commercial orientation processes are BOPP tenter process, blown film, and LISIM technology.

The total thickness of the resulting monolayer and/or multilayer films can vary based, at least in part, on the particular end use application. While the film may be any thickness, a total film thickness of about ≥about 5.0 µm, e.g., ≥about 7.5 µm, ≥about 10.0 µm, ≥about 12.5 µm, ≥about 15.0 µm, ≥about 20.0 µm, ≥about 30.0 µm, ≥about 40.0 µm is generally suitable for most applications. Additionally or alternatively, the total film thickness may be ≤about 50.0 µm, ≤about 40.0 µm, ≤about 30.0 µm, ≤about 20.0 µm, ≤about 15.0 µm, ≤about 12.5 µm, ≤about 10.0 µm, or ≤about 7.5 µm. Ranges for the film thickness include, but are not limited to, about 5.0 to about 50.0 µm, about 5.0 to about 25.0 µm, about 10.0 to about 20 µm, or about 10.0 to about 15.0 µm µm can be suitable for most applications. Those skilled in the art will appreciate that the thickness of the film, or individual layers in the case of multilayer films, can be adjusted based on desired end use performance, polymer or copolymer employed, equipment capability and other factors.

Films of the invention have one or more advantageous properties. For example, polyethylene copolymers described herein provide a film having a dart drop impact of ≥10.0 g/µm, ≥11.0 g/µm, e.g., ≥about 15.0 g/µm, ≥about 20.0 g/µm, ≥about 25.0 g/µm, ≥about 35.0 g/µm, or ≥about 45.0 g/µm. Typically, although not necessarily, the film may have a dart drop impact of ≤about 50.0 g/µm, e.g., ≤about 45.0 g/µm, ≤about 35.0 g/µm, ≤about 25.0 g/µm, ≤about 20.0 g/µm, or ≤about 15.0 g/µm. Exemplary such films include, but are not limited to, those having a Dart Drop Impact of about 10.0 to about 20.0 g/µm, about 11.0 to about 50.0 g/µm, about 15.0 to about 45.0 g/µm, 20.0 to 35.0 g/µm, or about 25.0 µm, etc.

Additionally or alternatively, films according to embodiments of the invention may also have advantageous tensile strength. For example, some films comprising the polyethylene copolymers described herein have a tensile strength (at break) in the machine direction (referred to as the MD tensile strength) of ≥about 52 MPa (about 7,500 psi), e.g., ≥about 55 MPa (about 8,000 psi), ≥about 58 MPa (about 8,500 psi), ≥about 61 MPa (about 9,000 psi), ≥about 66 MPa (about 9,500 psi), ≥about 69 MPa (about 10,000 psi), or ≥about 83 MPa (about 12,000 psi). Typically, although not necessarily, the MD tensile strength is ≤about 103 MPa (about 15,000 psi), e.g., ≤83 MP (about 12,000 psi), ≤about 69 MPa (about 10,000 psi), ≤about 66 MPa (about 9,500 psi), ≤about 61 MPa (about 9,000 psi), ≤about 58 MPa (about 8,500 psi), or ≤about 55 MPa (about 8,000 psi). Exemplary such films may have a MD tensile strength at break of about 52 MPa (about 7,500 psi) to about 103 MPa (about 15,000 psi), about 55 MPa (about 8,000) to about 83 MPa (about 12,000 psi), about 58 MPa (about 8,500) to about 69 MPa (about 10,000 psi), etc. The tensile strength at break may also be measured in the transverse direction (referred to as the TD tensile strength). The TD tensile strength may be ≥about 34 MPa (about 5,000 psi), e.g., ≥about 41 MPa (about 6,000 psi), ≥about 48 MPa (about 7,000 psi), ≥about 55 MPa (about 8,000 psi), ≥about 62 MPa (about 9,000 psi), ≥about 69 MPa (about 10,000 psi), ≥about 86 MPa (about 12,500 psi), or ≥about 103 MPa (about 15,000 psi). Additionally or alternatively, the TD tensile strength may be ≤about 121 MPa (about 17,500 psi), e.g., ≤about 103 MPa (about 15,000 psi), ≤about 86 MPa (about 12,500 psi), ≤about 69 MPa (about 10,000 psi), ≤about 62 MPa (about 9,000 psi), ≤about 55 MPa (about 8,000 psi), ≤about 48 MPa (about 7,000 psi), or ≤about 41 MPa (about 6,000 psi). Exemplary ranges for the TD tensile strength include about 34 MPa (about 5,000 psi) to about 121 MPa (about 17,500 psi), about 41 MPa (about 6,000 psi) to about 103 MPa (about 15,000 psi), about 48 MPa (about 7,000 psi) to about 86 MPa (about 12,500 psi), about 55 MPa (about 8,000 psi) to about 83 MPa (12,000 psi), about 62 MPa (about 9,000 psi) to about 69 MPa (about 10,000 psi), about 41 MPa (about 6,000 psi) to about 69 MPa (about 10,000 psi), about 41 MPa (about 6,000 psi) to about 55 MPa (about 8,000 psi).

The ratio of the MD tensile strength to the TD tensile strength can be important. Any ratio of the MD tensile strength to the TD tensile strength (referred to as the MD/TD tensile strength) formed from the respective individual values described above is expressly disclosed. Exemplary films have a MD/TD tensile strength of about 0.4 to about 3.0, about 0.6 to about 2.0, about 0.8 to about 1.8, about 1.0 to about 1.6.

Some films have desirable elongation (at break) performance. Like tensile strength, elongation can be measured in both the MD and TD directions. Thus, some films comprising the polyethylene described herein have an elongation (at break) in the machine direction (referred to as "MD elongation")≥about 200%, e.g., ≥about 250%, ≥about 300%, ≥about 350%, ≥about 400%, or ≥about 450%. Additionally or alternatively, the MD elongation may be ≤about 500%, e.g., ≤about 450%, ≤about 400%, ≤about 350%, ≤about 300%, or ≤about 250. Exemplary such films may have a MD elongation at break of about 200 to about 500%, about 250 to about 450%, about 300 to about 400%, about 350%, etc. The elongation at break may also be measured in the transverse direction (referred to as the TD elongation). Some films are characterized by a TD elongation of ≥about 300%, e.g., ≥about 350%, ≥about 400%, ≥about 450%, ≥about 500%, ≥about 550%, ≥about 600%, ≥about 650%, ≥about 700%, or ≥about 750%. Additionally or alternatively, the TD elongation may be ≤about 800%, e.g., ≤about 750%, ≤about 700%, ≤about 650%, ≤about 600%, ≤about 550%, ≤about 500%, ≤about 450%, ≤about 400%, or ≤about 350%. Exemplary such films may have a TD elongation at break of about 300 to about 800%, about 350 to about 750%, about 350 to about 600%, about 350 to about 500%.

Some films comprising the polyethylene copolymers described herein have desired tear properties as indicated by the Elmendorf Tear value. For example, some films have an MD Elmendorf Tear ≥about 0.2 g/μm, e.g., ≥about 0.3 g/μm, ≥about 0.4 g/μm, ≥about 0.5 g/μm, ≥about 0.6 g/μm, ≥about 1.0 g/μm, ≥about 1.3 g/μm, ≥about 1.5 g/μm, ≥about 1.7 g/μm, ≥about 2.0 g/μm, ≥about 5.0 g/μm, ≥about 7.5 g/μm. Additionally or alternatively, the MD Elmendorf Tear may be ≤about 10.0 g/μm, e.g., ≤about 7.5 g/μm, ≤about 5.0 g/μm, ≤about 2.0 g/μm, ≤about 1.7 g/μm, ≤about 1.5 g/μm, ≤about 1.3 g/μm, ≤about 1.0 g/μm, ≤about 0.5 g/μm, ≤about 0.4 g/μm, or ≤about 0.3 g/μm. Exemplary such films may have a MD Elmendorf Tear of about 0.6 to about 5.0 g/μm, 0.2 to about 10.0 g/μm, about 0.4 to about 7.5 g/μm, about 0.5 to about 5.0 g/μm, about 1.0 to about 2.0 g/μm, about 1.3 to about 1.7 about g/μm. Some films had a TD Elmendorf Tear ≥about 1.0 g/μm, e.g., ≥about 2.4 g/μm, ≥about 3.0 g/μm, ≥about 5.0 g/μm, ≥about 7.5 g/μm, ≥about 10.0 g/μm, ≥about 12.5 g/μm, ≥about 15.0 g/μm, ≥about 20.0 g/μm, or ≥about 25.0 g/μm. Additionally or alternatively, the TD Elmendorf Tear may be ≤to about 30.0 g/μm, e.g., ≤to about 25.0 g/μm, ≤to about 20.0 g/μm, ≤to about 15.0 g/μm, ≤to about 12.5 g/μm, ≤to about 10.0 g/μm, ≤to about 7.5 g/μm, ≤to about 5.0 g/μm, or ≤to about 3.0 g/μm. Exemplary such films may have a MD Elmendorf Tear of about 2.4 to about 15.0 g/μm, about 1.0 to about 30.0 g/μm, about 3.0 to about 25.0 g/μm, about 3.0 to about 20.0 g/μm, about 3.0 to about 15.0 g/μm, and about 3.0 to about 10.0 about g/μm.

For some applications, the ratio of the MD to TD Elmendorf Tear values is important. Any ratio of the MD Elmendorf Tear to the TD Elmendorf Tear (referred to as the MD/TD Elmendorf Tear ratio) formed from the respective individual values described above is expressly disclosed. Exemplary films have a MD/TD Elmendorf Tear ratio ≥about 0.05, e.g., ≥about 0.07, ≥about 0.09, ≥about 0.12, ≥about 0.15, ≥about 0.18, ≥about 0.21, ≥about 0.24, or ≥about 0.27. Additionally or alternatively, the MD/TD Elmendorf Tear ratio may be ≤about 0.30, ≤about 0.27, ≤about 0.24, ≤about 0.21, ≤about 0.18, ≤about 0.15, ≤about 0.12, ≤about 0.09, or ≤about 0.07, etc. Exemplary ranges include, but are not limited to, about 0.05 to about 0.30, about 0.07 to about 0.27, about 0.09 to about 0.24, about 0.12 to about 0.18, or about 0.15.

Test Methods

The following test methods should be utilized to obtain the numerical values for certain properties and features as disclosed, e.g. density, productivity, chromium content, or flow indices or melt indices, although it is understood that those values also refer to any results obtained by other testing or measuring methods that might not necessarily be disclosed herein, provided such other testing or measuring methods are published, e.g., in at least one patent, patent application, or scientific publication. Also, it is understood that the values set forth in the claims may have some degree of error associated with their measurement, whether experimental, equipment, or operator error; and that any value in the claim is approximate only, and encompasses values that are plus or minus (+/−) 10% or even 20% from the measured value.

Density values are based on ASTM D1505.

Flow Index ($I_{21}$) values are based on ASTM D1238, run at 190° C., with 21.6 kg weight; the standard designation for that measurement is 190/21.60.

Melt Index ($I_5$) values are based on ASTM D1238, run at 190° C., with 5.0 kg weight; the standard designation for that measurement is 190/5. Melt Index ($I_2$) values are based on ASTM D1238, run at 190° C., with 2.16 kg weight; the standard designation for that measurement is 190/2.16.

Mw, Mn and Mw/Mn are determined by using a High Temperature Gel Permeation Chromatography (Polymer Laboratories), equipped with a differential refractive index detector (DRI). Three Polymer Laboratories PLgel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation:

$$\log M_X = \frac{\log(K_X/K_{PS})}{a_X + 1} + \frac{a_{PS} + 1}{a_X + 1}\log M_{PS}$$

where the variables with subscript "X" stand for the test sample while those with subscript "PS" stand for PS. In this method, $a_{PS}$=0.67 and $K_{PS}$=0.000175 while $a_X$ and $K_X$ are obtained from published literature. Specifically, a/K=0.695/0.000579 for PE and 0.705/0.0002288 for PP.

The concentration, c, at each point in the chromatogram is calculated from the baseline-subtracted DRI signal, $I_{DRI}$, using the following equation:

$$c = K_{DRI}I_{DRI}/(dn/dc)$$

where $K_{DRI}$ is a constant determined by calibrating the DRI, and (dn/dc) is the refractive index increment for the system. Specifically, dn/dc=0.109 for polyethylene.

The mass recovery is calculated from the ratio of the integrated area of the concentration chromatography over elution volume and the injection mass which is equal to the pre-determined concentration multiplied by injection loop volume.

All molecular weights are reported in g/mol unless otherwise noted. In event of conflict between the GPC-DRI procedure and the "Rapid GPC," the GPC-DRI procedure immediately above shall be used. Further details regarding methods of determining Mw, Mn, MWD are described in US 2006/0173123 page 24-25, paragraphs [0334] to [0341].

Dart Drop Impact, reported in grams (g) or grams per micron (g/µm), is measured as specified by ASTM D-1709, method A, at a dart drop height of 0.66 meter (or 26 inches). The dart head is constructed of phenolic. The weight of the dart head, shaft, and the locking collar was weighed each time prior to testing and the result was included in the total weight for dart drop impact calculation. A minimum of 20 drops were performed to achieve a 50% failure. Specimens of approximately seven inches wide were cut across the web of the fabricated film, and multiple specimens were used to accumulate the required drops at the targeted 50% failure rate.

Elmendorf Tear strength is measured according to ASTM D1922-94. Flexural Modulus (2% Secant) is measured according to ASTM D882-10. Tensile Strength is measured according to ASTM D-882. Stress-strain behavior in uniaxial tension is measured using ASTM D1708 microtensile specimens. Samples are stretched with an Instron at 50 mm/min at 23° C. Values should be determined from the average of five specimens according to commonly accepted statistical treatment.

The discussion herein illustrates, among other things, that embodiments of the present disclosure provide a film comprising a medium density polyethylene having a unique balance of properties. Advantageously, polyethylenes herein have acceptable flow properties, as measured by I12/I5, provide films with improved Dart Impact performance, high elongation at break, and/or improved tear properties. These properties make them particularly suitable for packaging applications.

Particular Embodiments

Embodiment A. A film comprising: a polyethylene having a density in the range of from 0.920 to 0.950 g/cc and an $I_{21}/I_5 \leq 32.0$, wherein the film has a dart drop impact of $\geq 11.0$ g/µm.

Embodiment B. A method of making a film having improved dart impact, comprising (a) providing a polyethylene having a density of 0.920 to 0.950 g/cc and an $I_{21}/I_5 \leq 32.0$; and (b) forming the polyethylene into a film; wherein the film has a dart drop impact of $\geq 11.0$ g/µm.

Embodiment C. Embodiment A or B, wherein the polyethylene comprises a copolymer derived from ethylene and one or more $C_3$ to $C_{20}$ α-olefin co-monomers, e.g., $C_3$ to $C_{10}$ α-olefins, $C_4$ to $C_8$ α-olefins.

Embodiment D. Any of Embodiments A to C, wherein the polyethylene has a melt index ($I_5$) of 0.3 to about 0.7 g/10 min.

Embodiment E. Any of Embodiments A to D, wherein the polyethylene has a flow index ($I_{21}$) of about 5.0 to about 30.0 g/10 min.

Embodiment F. Any of Embodiments A to E, wherein the polyethylene has an $I_{21}/I_5$ of about 20.0 to 26.0, e.g., 22.0 to 26.0 or 24.0 to 26.0.

Embodiment G. Any of Embodiments A to F, wherein the film has a dart drop impact of $\geq 15.0$ g/µm, e.g., 15.0 to 50.0 g/µm, 20.0 to 40.0 g/µm, or 25.0 to 35.0 g/µm.

Embodiment H. Any of Embodiments A to G, wherein the polyethylene has a CDBI value of $\leq 50$, e.g., $\leq 40$, $\leq 30$, $\leq 35$, $\leq 30$, $\leq 25$.

Embodiment I. Any of Embodiments A to H, wherein the polyethylene has a Mw $\geq$about 100,000 g/mol, e.g., $\geq$about 200,000 g/mol, $\geq$about 300,000 g/mol, $\geq$about 400,000 g/mol, $\geq$about 500,000 g/mol, $\geq$about 750,000 g/mol, $\geq$about 1,000,000 g/mol.

Embodiment J. Any of Embodiments A to I, wherein the film has a TD Elmendorf Tear of $\geq 4.0$ g/µm, e.g., 4.0 to 20.0 g/µm, 4.0 to 15.0 g/µm, or 6.0 to 15.0 g/µm.

Embodiment K. Any of Embodiments A to J, The film of claim 1, wherein the film has an MD Elmendorf Tear $\geq 0.5$ g/µm.

Embodiment L. Any of Embodiments A to K, wherein the film has a TD Elmendorf Tear to dart drop impact of $\geq 0.2$, e.g., 0.2 to 1.0, 0.3 to 0.8, or 0.4 to 0.7.

Embodiment M. Any of Embodiments A to L, wherein the Elmendorf Tear Ratio (MD/TD) is 0.05 to 1.0, e.g., 0.08 to 0.5, 0.09 to 0.4, or 0.1 to 0.3.

Embodiment N. Any of Embodiments A to M, wherein the 2% secant modulus is 620 MPa, e.g., 620 to 1380 MPa, 655 to 758 MPa, 690 to 724 MPa.

Embodiment O. Any of Embodiments A to N, wherein the ratio of the flow index ($I_{21}$) of the polyethylene to the TD Elmendorf Tear (g/µm) of the film is $\leq 10.0$µ/10 min., e.g., 0.5 to 5.0µ/10 min., 0.8 to 4.0µ/10 min., or 1.0 to 3.0µ/10 min.

Embodiment P. Any of Embodiments A to O, wherein the polyethylene has a Mw/Mn $\geq$to 6.0, e.g., $\geq 16.0$, e.g., 6.0 to 30, 6.0 to 20, or 10.0 to 16.0.

Embodiment Q. Any of Embodiments A to P, wherein the film has a thickness of 5.0 to 50.0 µm, e.g., 5.0 to 25.0 µm, 10.0 to 20.0 µm, or 10.0 to 15.0 µm.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following Examples are put forth so as to provide those skilled in the art with a complete disclosure and description of how to make and use the compounds of the invention, and are not intended to limit the scope of that which the inventors regard as their invention.

In each example, the film specimens were fabricated on a 50 mm Alpine line with grooved feed barrel, 21 L/D, 120 mm die, 1.4 mm die gap, and a 4:1 blow-up ratio at 54 kg/hr output rate. In the inventive examples, a developmental catalyst was used. The catalyst was an ACCLAIM™ K-100 Catalyst preparation, either ACCLAIM™ K-110 Catalyst or an ACCLAIM™ K-120 Catalyst depending on a small difference in the aluminum (DEAlE) concentration on the catalyst. For the comparative examples, a silyl chromate UCAT™ G Catalyst was used, which is available from UNIVATION Technologies.

Inventive Catalyst Preparation (Reduced Chromium Oxide Catalyst)

Inventive catalysts employed in the Examples were activated on a commercial scale as follows. A suitable quantity of a porous silica support containing about 5 weight percent chromium acetate (Grade C35300MSF chromium on silica, produced by PQ Corporation), which amounts to about 1 weight percent Cr content, having a particle size of about 82 microns and a surface area of about 500 square meters per gram was charged to a fluidized bed heating vessel. There, the catalyst precursor (chromium on silica) was heated slowly at a rate of about 50° C. per hour under dry nitrogen up to 200° C. and held at that temperature for about 4 hours. Next, the chromium on silica was heated slowly at a rate of about 50° C. per hour under dry nitrogen up to 450° C. and held at that temperature for about 2 hours. The nitrogen stream was then replaced with a stream of dry air and the chromium on silica was heated slowly at a rate of about 50° C. per hour to 600° C. where it was activated for about 6 hours. The activated catalyst was then cooled with dry air (at ambient temperature) to about 300° C. and further cooled from 300° C. to room temperature with dry nitrogen (at ambient temperature). The resulting cooled chromium oxide catalyst powder was stored under nitrogen atmosphere until treated with a reducing agent in a mixing vessel.

For chromium oxide catalyst pilot scale reduction, about 0.86 kg (1.88 lb) commercially prepared activated catalyst support above was placed in a vertical catalyst blender with a double helical ribbon agitator under an inert atmosphere. Dried hexane or isopentane solvent was added to adequately suspend the supported catalyst as a slurry. All catalysts of the invention used PQ C35300MSF silica in the Examples listed in Tables 1 through 5. There were about 7.1 liters of solvent charged per kilogram (0.89 gallons per pound) of silica support. DEAlE, available from Akzo Nobel, and obtained as a 25 wt % solution in isopentane or hexane, was then added above the surface of the catalyst slurry at a selected rate over about a 40 minute time period to obtain a selected weight percent aluminum loading on the catalyst. The mixture was agitated at a selected agitation rate at a temperature of approximately 45° C. during the addition time. The mixture was further agitated at a controlled rate for about 1 hour on a pilot scale or 2 hours on a commercial scale. Then the solvent was substantially removed by drying at a selected jacket temperature for about 16 to 21 hours. The jacket temperature was selected to give a material temperature that lined out near the target of 61, 64, 71, or 81° C. during the later hours of drying. Pilot-scale C35300MSF-based catalysts were generally dried for 16 hours total with progressively stronger vacuum being applied as drying time increased. The resulting dry, free flowing catalyst powder was stored in a container under nitrogen pressure until used.

UCAT™ G-150 Catalyst Preparation

Silyl Chromate Catalyst General Preparation

All silicas are dehydrated prior to use, for example, Sylopol 955 silica. Silica dehydration is conducted by passing gas through the silica for four hours at the specified temperature in dry air or nitrogen. In a typical laboratory preparation that may be scaled to the pilot scale, 3 grams of previously dehydrated silica is placed in a 50 ml airless ware flask with a stir bar under inert atmosphere. Thirty-five ml of dry degassed hexane is added and the mixture is heated to 50° C. The organochrome source (bis-triphenyl silylchromate, TPSC)) can be added prior to, at the same time as, or after addition of the diluent. The mixture is typically stirred for 2 hours (where stated, stirring can continue for 10 hours). The reducing agent, DEAlE, is then added via syringe (all reagents are 20-25 wt % in hexane). The stated equivalents are always the ratio of reagent to chromium. For example, UCAT™ G-150 Catalyst has 1.5 molar equivalents of aluminum (reagent) to chromium. After mixing for 30 minutes, drying is commenced. This can be done under high vacuum or with a nitrogen purge. Catalyst is stored under nitrogen until used. In cases where no reducing agent is added, drying commences after the chrome source and silica have been mixed as above.

The developmental and the comparative catalysts were used to demonstrate the inventive resins according to the following process. The typical pilot scale gas phase fluidized bed polymerization reactor comprises a fluidized bed, a distributor plate, and expanded section or cyclone system at the top or cyclone system to reduce the amount of resins fines that may escape from the fluid bed. It further comprises a cooling system to decrease the heat of polymerization and maintain the reactor bed at the target temperature. There is further a compressor blower of sufficient power to cycle the gas around from the top to the bottom inlet of the reactor and through the plate and fluidized bed. The composition of the gas is monitored to maintain specific concentrations that define polymer properties as one skilled in the art understands. Cooling the gas may result in it dropping below the dew point at which time the reactor is said to be in condensing mode and liquids are present downstream of the cooler and in the bottom head below the distributor plate.

Catalyst may be fed to the reactor from high pressure devices: 1) which is a syringe pump with the catalyst in a slurry, and 2) a dry powder using a metered disk. Catalyst typically enters the bed in the lower ⅓ of its height. Additional details are known by those skilled in the art. Polyethylene powder comprises the fluidized bed and is discharged through isolation ports (Product Discharge System as is known by those skilled in art) in response to the increase of the fluidized bed weight with ongoing polymerization.

Comparative Example A

Comparative Example A used MARLEX HHM TR-144, a polyethylene resin available from Chevron Phillips. The density was about 0.948 g/cc; higher than the nominal 0.940 to 0.941 g/cc for the examples of the invention. A chromium-based catalyst was used in Example A, possibly a chromium oxide type catalyst. Polymerization conditions were not known. Toughness properties for film may vary with density including the dart drop and tear strength. Results are shown in Table 1. Comparative Example A resin was processed and its properties measured at the same time as Comparative Example B, Comparative Example C, and the inventive Example 1.

Comparative Example B

Comparative Example B is a comparative using EVALENE HDPE HF14462, a polyethylene resin available from JG Summit Petrochemical Corporation. The density was about 0.948 g/cc; higher than the nominal 0.940 to 0.941 g/cc of the examples of the invention. Toughness properties may vary with density including both the dart drop and tear. To establish a range of densities for the invention, the results are shown in Table 1. Polymerization conditions were unknown. A silyl chromate based UCAT™ G-150 Catalyst was used to make the sample. Comparative Example B resin was processed and properties measured at the same time as Comparative Examples A and C, and as the same time as the inventive Example 1. Results are shown in Table 1.

Comparative Example C

Comparative Example C is comparative in the density range of about 0.940 g/cm³ to 0.941 g/cm³. It was produced using LITEN FB 10, a polyethylene resin available from UNIPETROL. Polymerization conditions were unknown except that a silyl chromate based UCAT™ G-150 Catalyst was used to make the sample. Comparative Example C resin was processed and properties measured at the same time and data set as Comparative Examples A and B, and inventive Example 1. Results are shown in Table 1

Example 1 (Inventive)

Example 1 shows the inventive step comprising a developmental polyethylene resin made using the gas-phase polymerization process and ACCLAIM™ K-120 Catalyst described above. Lab and film specimens were produced. Example 1 resin was part of a first data set of specimens comprising Comparative Examples A, B, C and Example 1. Resins were processed and properties measured in the lab at the same time as part of the same set of data. Pilot plant polymerization reactor conditions are provided in Table 2 below.

Based on improvements in film tear strength and dart drop for Example 1 vs. Comparative Examples A, B and C, another set of four experiments were carried out with pilot plant carefully prepared samples in back-to-back comparison of ACCLAIM™ K-110 Catalyst to UCAT™ G Catalyst. Refer to Tables 3 and 4. These are inventive Example 2 vs. the Comparative Example D; both being 1-butene-ethylene copolymers. Next are inventive Example 3 vs. Comparative Example E; both being 1-hexene-ethylene copolymers.

Comparative Example D

Comparative Example D is a comparative example to inventive Example 2. The resin of Comparative Example D was a high molecular weight polyethylene 1-butene copolymer resin produced using a UCAT™ G-150 Catalyst available from Univation Technologies. Pilot plant polymerization reactor conditions are provided in the Table 4.

Example 2 (Inventive)

In Example 2, a developmental polyethylene resin made using the process and ACCLAIM™ K-110 Catalyst described above was used to produce film and other specimens for analyses. Refer to Table 3. Pilot plant polymerization reactor conditions are provided in Table 4.

Comparative Example E

Comparative Example E is comparative to Example 3. The resin of Comparative Example E was a medium to high molecular weight ethylene 1-hexene copolymer produced using a UCAT™ G-150 Catalyst available from Univation Technologies. Film and other specimens were prepared and physical properties measured in Table 3. Pilot plant polymerization reactor conditions are provided in Table 4.

Example 3 (Inventive)

In Example 3, a developmental polyethylene resin made using the process and Acclaim™ K-110 Catalyst described above was used to produce film and other specimens. Refer to Table 3 for their analyses. Pilot plant polymerization reactor conditions are provided in Table 4.

TABLE 1

First Set Polymer and Film Properties

| | Property | Comp. Ex. A | Comp. Ex. B | Comp. Ex. C | Ex. 1 (Inventive) |
|---|---|---|---|---|---|
| | Catalyst | Cr | UCAT G-150 | UCAT G-150 | ACCLAIM K-120 |
| Polymer Properties | Co-monomer | 1-Hexene | 1-Hexene | 1-Hexene | 1-Hexene |
| | Density, g/cm³ | 0.9476 | 0.9484 | 0.9404 | 0.9403 |
| | $I_2$, g/10 min | 0.188 | 0.136 | 0.11 | 0.101 |
| | $I_5$, g/10 min | 0.832 | 0.63 | 0.53 | 0.53 |

TABLE 1-continued

First Set Polymer and Film Properties

|  | Property | Comp Ex. A | Comp. Ex. B | Comp. Ex. C | Ex. 1 (Inventive) |
|---|---|---|---|---|---|
|  | $I_{21}$, g/10 min | 17.7 | 15.3 | 13.6 | 13.7 |
|  | $I_{21}/I_5$ | 21.3 | 24.4 | 25.6 | 25.9 |
|  | Flexural Modulus - 2% Secant, MPa | 876 | 886 | 706 | 684 |
|  | Tensile stress, yield, MPa | 22.5 | 22.7 | 18.4 | 19.1 |
|  | Strain at yield, % | 8.8 | 9.8 | 9.2 | 9.4 |
|  | Tensile strength, break, MPa | 29.6 | 31.2 | 32.6 | 30.4 |
|  | Elongation at break, % | 767.0 | 825.3 | 905 | 785 |
| Film properties | Film gauge, μm | 12.7 | 12.7 | 13.2 | 11.4 |
|  | Tensile strength, break, MD/TD, MPa | 64.1/55.1 | 64.0/56.7 | 54.6/49.8 | 68.8/43.6 |
|  | Elongation at break, MD/TD, % | 341/521 | 312/475 | 318/445 | 327/554 |
|  | Elmendorf Tear, MD/TD, g | 5.8/73.3 | 6.3/45.5 | 7.0/19.0 | 6.8/73.7 |
|  | Elmendorf Tear, MD/TD, g/μm | 0.46/5.77 | 0.50/3.58 | 0.53/1.44 | 0.60/6.46 |
|  | Elmendorf Tear, Ratio, MD/TD | 0.080 | 0.140 | 0.368 | 0.093 |
|  | Dart Drop Impact, g | 94.8 | 128.3 | 98 | 132 |
|  | Dart Drop Impact, g/μm | 7.46 | 10.10 | 7.42 | 11.55 |
|  | TD Elmendorf Tear to Dart Drop Impact | 0.77 | 0.35 | 0.19 | 0.56 |

*Film extruded on 50 mm Alpine line, grooved feed, 21 L/D, 120 mm die, 1.4 mm die gap, 4:1 blow-up ratio, 54 kg/hr output rate.

TABLE 2

First Set Polymerization Reaction Conditions

|  | Property | Comp. Ex. A | Comp. Ex. B | Comp. Ex. C | Ex. 1 (Inventive) |
|---|---|---|---|---|---|
| Reaction Conditions | Co-monomer | 1-Hexene | 1-Hexene | 1-Hexene | 1-Hexene |
|  | Reaction Temperature, °C. | — | — | — | 103 |
|  | C2 Partial Pressure, psia | — | — | — | 200 |
|  | H2/C2 Gas Mol Ratio | — | — | — | 0.060 |
|  | C$x$/C2 Gas Mol Ratio | — | — | — | 0.012 |
|  | O2/C2, ppmv | — | — | — | 31 |
|  | Residence Time in R$x$, hrs | — | — | — | 2.9 |
|  | SGV, ft/s | — | — | — | 1.77 |

TABLE 3

Second Set Polymer and Film Properties

|  | Property | Comp. Ex. D | Ex. 2 (Inventive) | Comp. Ex. E | Ex. 3 (Inventive) |
|---|---|---|---|---|---|
|  | Catalyst | UCAT G-150 | ACCLAIM K-110 | UCAT G-150 | ACCLAIM K-110 |
| Polymer Properties | Co-monomer | 1-Butene | 1-Butene | 1-Hexene | 1-Hexene |
|  | Density, g/cm$^3$ | 0.9403 | 0.9407 | 0.9400 | 0.9406 |
|  | $I_2$, g/10 min | 0.070 | 0.078 | 0.089 | 0.127 |
|  | $I_5$, g/10 min | 0.33 | 0.41 | 0.45 | 0.56 |
|  | $I_{21}$, g/10 min | 9.5 | 10.2 | 11.9 | 13.0 |
|  | $I_{21}/I_5$ | 28.5 | 24.8 | 26.3 | 23.1 |
|  | Flexural Modulus - 2% Secant, MPa | 703 | 708 | 688 | 696 |
|  | Tensile Stress, Yield, MPa | 18.0 | 17.9 | 16.3 | 18.5 |
|  | Strain at Yield, % | 9.7 | 9.7 | 10.1 | 9.6 |
|  | Tensile Strength, Break, MPa | 35.8 | 33.6 | 33.5 | 34.5 |
|  | Elongation at Break, % | 934 | 864 | 836 | 860 |

TABLE 3-continued

Second Set Polymer and Film Properties

| | Property | Comp. Ex. D | Ex. 2 (Inventive) | Comp. Ex. E | Ex. 3 (Inventive) |
|---|---|---|---|---|---|
| Film properties | Film Gauge, μm | 13.5 | 13.7 | 12.4 | 11.7 |
| | Tensile Strength, Break, MD/TD, MPa | 51.66/49.34 | 54.64/60.10 | 67.39/60.55 | 63.55/61.31 |
| | Elongation at Break, MD/TD, % | 187/471 | 302/435 | 326/506 | 323/448 |
| | Elmendorf Tear, MD/TD, g | 6.38/5.64 | 8.96/33.1 | 6.7/57.0 | 9.16/69.7 |
| | Elmendorf Tear, MD/TD, g/μm | 0.47/0.42 | 0.65/2.42 | 0.54/4.60 | 0.78/5.96 |
| | Elmendorf Tear, Ratio, MD/TD | 1.13 | 0.27 | 0.12 | 0.14 |
| | Dart Drop Impact, g | 100.5 | 141 | 159 | 176 |
| | Dart Drop Impact, g/μm | 7.4 | 10.3 | 12.8 | 15.0 |

*Film extruded on 50 mm Alpine line, grooved feed, 21 L/D, 120 mm die, 1.4 mm die gap, 4:1 blow-up ratio, 54 kg/hr output rate.

TABLE 4

Second Set Polymerization Reaction Conditions

| | Property | Comp. Ex. D | Ex. 2 (Inventive) | Comp. Ex. E | Ex. 3 (Inventive) |
|---|---|---|---|---|---|
| Reaction Conditions | Co-monomer | 1-Butene | 1-Butene | 1-Hexene | 1-Hexene |
| | Reaction Temperature, °C. | 88 | 101 | 91 | 104 |
| | C2 Partial Pressure, psia | 200 | 200 | 200 | 200 |
| | H2/C2 Gas Mol Ratio | 0.010 | 0.087 | 0.010 | 0.20 |
| | Cx/C2 Gas Mol Ratio | 0.0373 | 0.0394 | 0.0160 | 0.0121 |
| | O2/C2, ppmv | 0 | 23.2 | 0 | 50.1 |
| | Residence Time in Rx, hrs | 3.27 | 2.34 | 3.11 | 2.10 |
| | SGV, ft/s | 1.75 | 1.82 | 1.73 | 1.83 |

Indications of improved film toughness are the Drop Dart and Elmendorf Tear. Normalized values based on film thickness are provided in Table 5 for ACCLAIM™ K-110 and ACCLAIM™ K-120 vs. UCAT™ G-150 and 1-hexene vs. 1-butene copolymers. The results should be compared in the following manner: Comparative Example C and Example 1; Comparative Example D and Example 2; and Comparative Example E and Example 3.

TABLE 5

Film Toughness Measurements

| Comparative Example or Example | Catalyst | Co-monomer | Normalized Drop Dart g/μm | Normalized Elmendorf Tear MD/TD, g/μm |
|---|---|---|---|---|
| Comp. Ex. C | G-150 | 1-Hexene | 7.42 | 0.53/1.44 |
| Ex. 1 | K-120 | 1-Hexene | 11.55 (55.7% improvement relative Comp. Ex. C) | 0.60/6.46 |
| Comp. Ex. D | G-150 | 1-Butene | 7.4 | 0.47/0.42 |
| Ex. 2 | K-110 | 1-Butene | 10.3 (39.2% improvement relative Comp. Ex. D) | 0.65/2.42 |
| Comp. Ex. E | G-150 | 1-Hexene | 12.8 | 0.54/4.60 |
| Ex. 3 | K-110 | 1-Hexene | 15.0 (17.2% improvement relative Comp. Ex. C) | 0.78/5.96 |

*Film extruded on 50 mm Alpine line, grooved feed, 21 L/D, 120 mm die, 1.4 mm die gap, 4:1 blow-up ratio, 54 kg/hr output rate.

What is claimed is:

1. A film comprising: a polyethylene copolymer formed using a reduced chromium oxide catalyst, ethylene monomers and a co-monomer selected from the group consisting of 1-butene and 1-hexene, the polyethylene copolymer formed with the co-monomer to ethylene monomer mole ratio in a range of about 0.012 to about 0.04 to form the polyethylene copolymer having a density in the range of from about 0.9350 to about 0.950 g/cm$^3$ and an $I_{21}/I_5$ in a range of about 18.0 to about 30.0, wherein the polyethylene copolymer formed using the reduced chromium oxide catalyst provides an improvement in a dart drop impact (g/μm) of the film of 17 percent to 56 percent as compared to a film of the polyethylene copolymer formed using a silyl chromate catalyst in place of the reduced chromium oxide catalyst.

2. The film of claim 1, where the reduced chromium oxide catalyst is reduced with diethylaluminum ethoxide (DEAlE).

3. The film of claim 1, wherein the polyethylene copolymer has a melt index ($I_5$) of about 0.4 to about 1.0 g/10 min.

4. The film of claim 1, wherein the polyethylene copolymer has a flow index ($I_{21}$) of about 5.0 to about 25.0 g/10 min.

5. The film of claim 1, wherein the polyethylene copolymer has an $I_{21}/I_5$ of about 18.0 to about 28.0.

6. The film of claim 1, wherein the film has a dart drop impact of about 10.0 to about 20.0 g/μm.

7. The film of claim 1, wherein the polyethylene copolymer has a Mw ≥about 100,000 g/mol.

8. The film of claim 1, wherein the film has a TD Elmendorf Tear of about 2.4 g/μm to about 15.0 g/μm.

9. The film of claim 1, wherein the film has an MD Elmendorf Tear of about 0.6 g/μm to about 5.0 g/μm.

10. The film of claim 1, wherein the film has a 2% secant modulus from about 600 MPa to about 1400 MPa.

11. The film of claim 1, wherein the polyethylene copolymer has a Mw/Mn of about 6.0 to about 50.0.

12. A method of making a film having improved dart impact, comprising
providing a polyethylene copolymer formed using a reduced chromium oxide catalyst, ethylene monomers and a co-monomer selected from the group consisting of 1-butene and 1-hexene, where the co-monomer to ethylene monomer mole ratio is in a range of about 0.012 to about 0.04 to form the polyethylene copolymer having a density in the range of from about 0.935 to about 0.950 g/cm$^3$ and an $I_{21}/I_5$ in a range of about 18 to about 30; and forming the polyethylene into a film; wherein the polyethylene copolymer formed using the reduced chromium oxide catalyst provides an improvement in a dart drop impact (g/μm) of the film of 17 percent to 56 percent as compared to a film of the polyethylene copolymer formed using a silyl chromate catalyst in place of the reduced chromium oxide catalyst.

13. The method of claim 12, wherein the polyethylene copolymer has a melt index ($I_5$) of about 0.4 to about 1.0 g/10 min.

14. The method of claim 12, wherein the polyethylene copolymer has a flow index ($I_{21}$) of about 5.0 to about 25.0 g/10 min.

15. The method of claim 12, wherein the film has a dart drop impact of about 10.0 to about 20.0 g/μm.

16. The method of claim 12, wherein the polyethylene copolymer has a Mw ≥about 100,000 g/mol.

17. The method of claim 12, wherein the film has a TD Elmendorf Tear of about 2.4 g/μm to about 15.0 g/μm.

18. The method of claim 12, wherein the film has an MD Elmendorf Tear of about 0.6 g/μm to about 5.0 g/μm.

19. The method of claim 12, wherein the film has a 2% secant modulus from about 600 MPa to about 1400 MPa.

20. The method of claim 12, wherein the polyethylene copolymer has a Mw/Mn of about 6.0 to about 50.0.

* * * * *